United States Patent
Hattori et al.

(10) Patent No.: US 11,603,874 B2
(45) Date of Patent: Mar. 14, 2023

(54) JOINT MEMBER OF COMPOSITE AND JOINT STRUCTURE

(71) Applicant: MITSUBISHI HEAVY INDUSTRIES, LTD., Tokyo (JP)

(72) Inventors: Hidetaka Hattori, Tokyo (JP); Noriya Hayashi, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 462 days.

(21) Appl. No.: 16/790,922

(22) Filed: Feb. 14, 2020

(65) Prior Publication Data
US 2021/0088063 A1   Mar. 25, 2021

(30) Foreign Application Priority Data

Sep. 24, 2019 (JP) .............................. JP2019-172808

(51) Int. Cl.
*F16B 7/02* (2006.01)

(52) U.S. Cl.
CPC ...................................... *F16B 7/02* (2013.01)

(58) Field of Classification Search
CPC .. F16B 7/0406; F16B 7/0426; F16B 2200/30; B29C 66/303; B29C 66/3032; B29C 66/30321; B29C 66/30325; B29C 66/124; B29C 66/1242; B29C 66/12423
See application file for complete search history.

(56) References Cited

U.S. PATENT DOCUMENTS

| | | | | |
|---|---|---|---|---|
| 4,687,395 A | * | 8/1987 | Berecz | B29C 65/601 411/501 |
| 4,786,343 A | * | 11/1988 | Hertzberg | B29C 66/71 156/92 |
| 4,869,277 A | * | 9/1989 | Olsen | B29C 65/18 433/166 |

(Continued)

FOREIGN PATENT DOCUMENTS

| | | |
|---|---|---|
| DE | 10 2015 222 297 | 5/2017 |
| JP | 2015-116672 | 6/2015 |

(Continued)

OTHER PUBLICATIONS

Extended European Search Report dated Jun. 25, 2020 in corresponding European Patent Application No. 20157367.2.

*Primary Examiner* — Jonathan P Masinick
(74) *Attorney, Agent, or Firm* — Wenderoth, Lind & Ponack, L.L.P.

(57) ABSTRACT

A joint member is formed of a composite including reinforcement fibers and resin. The joint member is configured to be joined with another joint member to form a joint structure capable of enduring a tensile load in a load direction in which the joint member and the other joint member are separated from each other at a joined portion of the joint structure in a longitudinal direction of the joint member. The joint member includes a main body part and a joint part connected with the main body part at an end part of the main body part in the longitudinal direction of the joint member. The joint part has an orientation pattern having anisotropy such that fiber directions of the reinforcement fibers included in the joint part include a fiber direction different from the longitudinal direction of the joint member.

20 Claims, 11 Drawing Sheets

(56) References Cited

U.S. PATENT DOCUMENTS

| | | | | |
|---|---|---|---|---|
| 5,153,978 | A * | 10/1992 | Simmons | B29C 65/606 |
| | | | | 29/525.07 |
| 5,361,483 | A * | 11/1994 | Rainville | B29C 66/72141 |
| | | | | 411/908 |
| 6,913,666 | B1 * | 7/2005 | Aeschlimann | B29C 66/74 |
| | | | | 411/908 |
| 8,049,120 | B2 * | 11/2011 | Prest | B29C 66/73161 |
| | | | | 174/535 |
| 8,551,381 | B2 * | 10/2013 | Kaps | B29C 66/472 |
| | | | | 264/258 |
| 8,993,084 | B2 * | 3/2015 | Griess | B32B 37/182 |
| | | | | 428/60 |
| 9,327,446 | B2 * | 5/2016 | Clark | B22F 5/009 |
| 9,931,809 | B2 * | 4/2018 | Kosugi | B29C 65/02 |
| 10,065,366 | B2 * | 9/2018 | Vetter | B29C 65/48 |
| 10,066,929 | B1 * | 9/2018 | Gu | G06T 7/001 |
| 10,076,898 | B2 * | 9/2018 | Strube | B32B 5/142 |
| 10,087,966 | B2 * | 10/2018 | Iwano | B29C 66/7392 |
| 10,710,327 | B2 * | 7/2020 | Butler | B29C 70/545 |
| 10,953,608 | B2 * | 3/2021 | Jahanbin | B29C 66/112 |
| 2003/0164219 | A1 * | 9/2003 | Brahm | B29C 66/21 |
| | | | | 156/73.1 |
| 2005/0125985 | A1 * | 6/2005 | Adams | B29C 66/21 |
| | | | | 29/524.1 |
| 2006/0163222 | A1 * | 7/2006 | Dance | B29C 66/30321 |
| | | | | 219/121.2 |
| 2007/0298200 | A1 | 12/2007 | Muller | |
| 2008/0003401 | A1 * | 1/2008 | Barnes | B29C 66/45 |
| | | | | 428/99 |
| 2020/0016843 | A1 * | 1/2020 | Mayer | B29C 66/81431 |

FOREIGN PATENT DOCUMENTS

| | | |
|---|---|---|
| JP | 2017-100394 | 6/2017 |
| WO | 2017/080746 | 5/2017 |

* cited by examiner

FIG.10
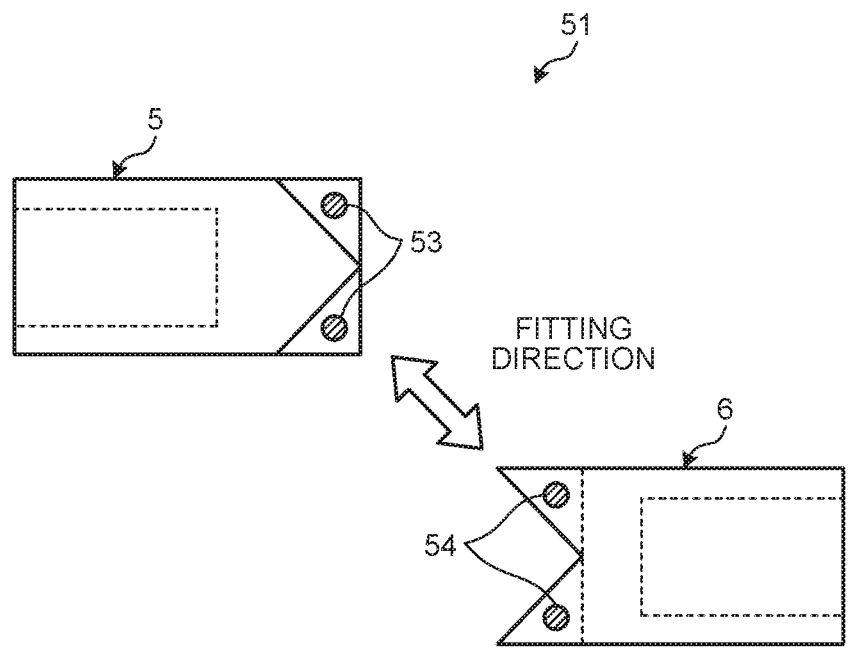
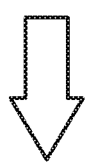
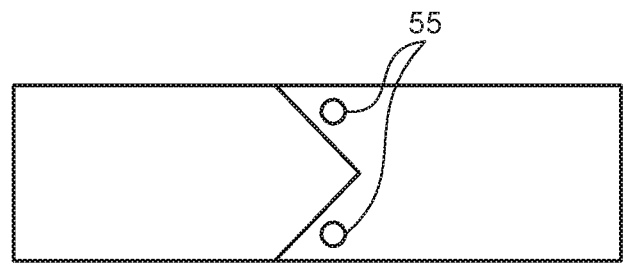

JOINT MEMBER OF COMPOSITE AND JOINT STRUCTURE

CROSS-REFERENCE TO RELATED APPLICATIONS

The present application claims priority to and incorporates by reference the entire contents of Japanese Patent Application No. 2019-172808 filed in Japan on Sep. 24, 2019.

FIELD

The present disclosure relates to a joint member of a composite and a joint structure.

BACKGROUND

It has been known that there is, as a joint member of a composite, a fiber-reinforced composite member formed by collecting a plurality of fiber-reinforced rod members (for example, see Japanese Patent Application No. 2015-116672). Each of the fiber-reinforced rod members is provided with a recessed part recessed with respect to an end surface, or a projecting part projecting from the end surface. The recessed part of a fiber-reinforced rod member is caused to abut against the projecting part of a fiber-reinforced rod member, and resin is injected into a space between the recessed part and the projecting part. In this manner, the fiber-reinforced rod members are joined.

SUMMARY

Technical Problem

A joined member in which composites are joined may be provided with a load, such as a tensile load, in a direction of tearing off the joined portion. In Japanese Patent Application No. 2015-116672, because the fiber-reinforced rod members are joined by injecting resin into a space between the recessed part and the projecting part, it is required to secure the joined state against the tensile load with adhesive force of the resin. However, in Japanese Patent Application No. 2015-116672, because use of an adhesive, such as resin, is required, dealing of the adhesive becomes complicated, such as implementation of pretreatment on the fiber-reinforced rod members. For this reason, to join the composites without using an adhesive, it is required to secure the joined state of composites against the tensile load by physically engaging the composites with each other. In this case, when fiber directions of the reinforcement fibers included in the composites coincide with a direction extending along the load direction, the reinforcement fibers of the composites become easily torn, and it becomes difficult to properly maintain the joined state of the composites.

For this reason, the present disclosure is aimed at providing a joint member of a composite and a joint structure capable of properly maintaining the joined state even when a load is provided.

Solution to Problem

A joint member of a composite including reinforcement fibers and resin and to be joined to a joining part according to an aspect of the present disclosure, includes: a main body part; and a joint part connecting with the main body part and to be joined to the joining part. The joint part includes a bulging part bulging toward the joining part in an opposed direction in which the joint part is opposed to the joining part, and has an orientation pattern having anisotropy such that fiber directions of the reinforcement fibers included in the joint part include a fiber direction different from a load direction of a load applied to a joined portion of the joint part and the joining part.

A joint structure according to another aspect of the present disclosure includes a plurality of the joint members of a composite. The joint part of one of the joint members serves as the joining part, and the joint part of the other joint member is joined to the joint part of the one joint member.

Advantageous Effects of Invention

The present disclosure enables proper maintenance of the joined state even when a load is provided.

BRIEF DESCRIPTION OF DRAWINGS

FIG. 10 is a diagram schematically illustrating a joint structure according to a fourth embodiment.

DESCRIPTION OF EMBODIMENTS

The following is a detailed explanation of embodiments according to the present disclosure with reference to drawings. The present invention is not limited to the embodiments. Constituent elements in the following embodiments include elements that can be replaced and easily conceivable by those skilled in the art, or substantially the same elements. The constituent elements described hereinafter can be appropriately combined, and the embodiments can be combined.

First Embodiment

A joint structure 1 according to a first embodiment is a structure formed by joining a joint member of a composite to a joining part. The following embodiments illustrate the case where the joining part is also a joint member of a composite, and the two joint members of composites are joined. While the two joint members of the composites are joined in the following embodiments, the joining part may be formed of a material different from the composite and may be a metal joining part, for example. While the two joint members of composites are joined in the first embodiment, a plurality of joint members may be joined. For example, three or more joint members may be joined.

Figure 1:
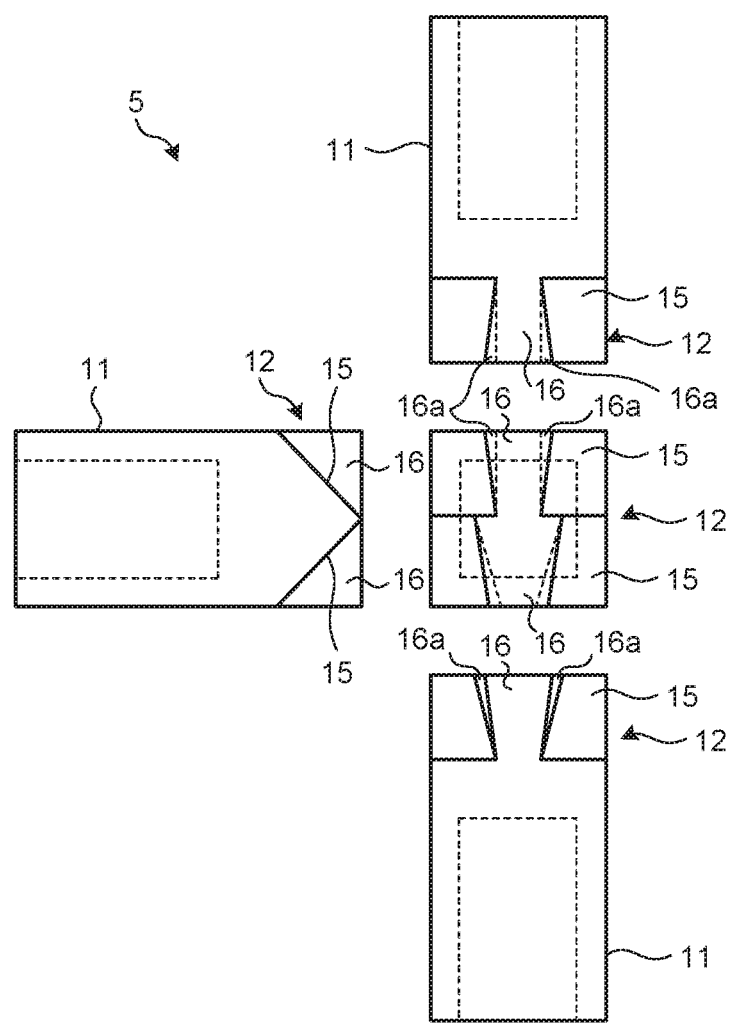
FIG. 1 illustrates four orthogonal views of one of joint members forming a joint structure according to a first embodiment.
Figure 2:
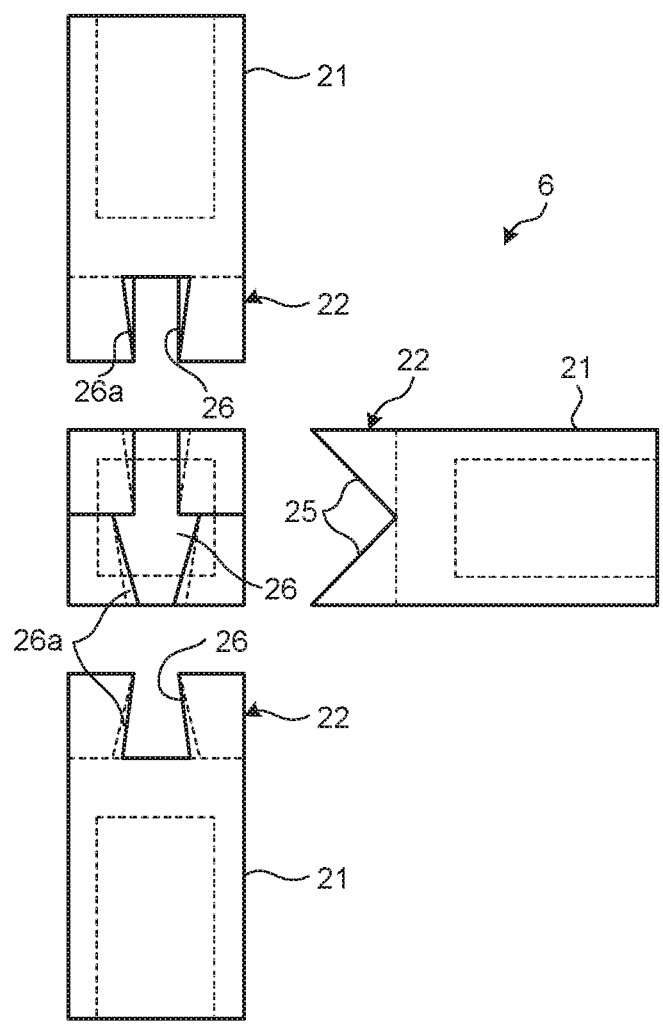
FIG. 2 illustrates four orthogonal views of the other of the joint members forming the joint structure according to the first embodiment.
Figure 3:
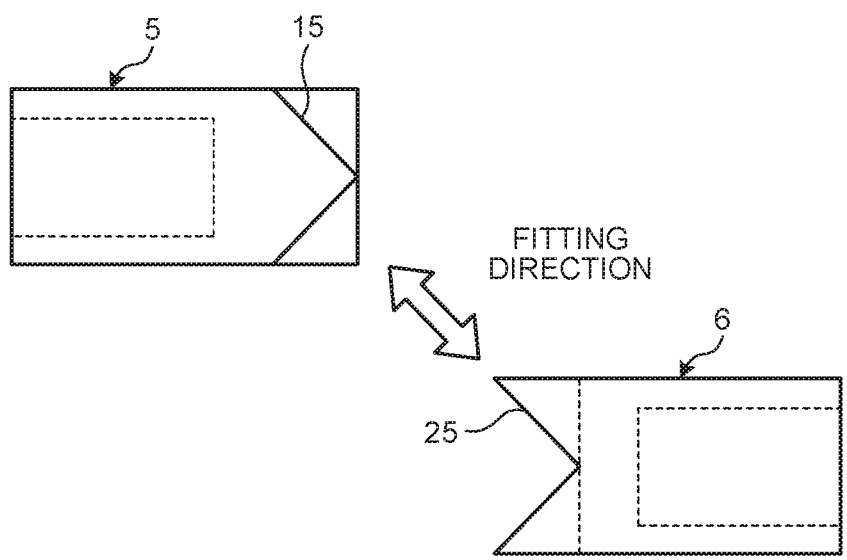
FIG. 3 is an explanatory diagram illustrating joining between the one joint member and the other joint member of the joint structure according to the first embodiment.
Figure 4:
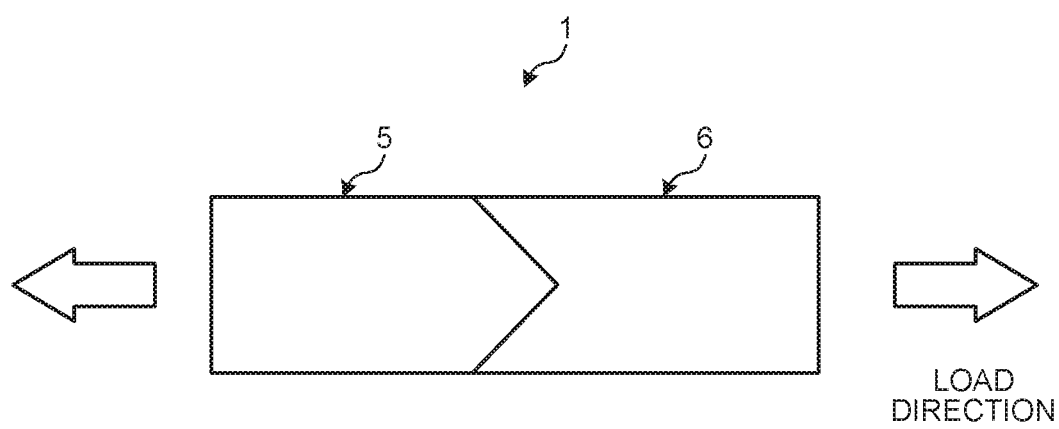
FIG. 4 is an explanatory diagram illustrating a state in which a tensile load is applied to the joint structure according to the first embodiment.
Figure 5:
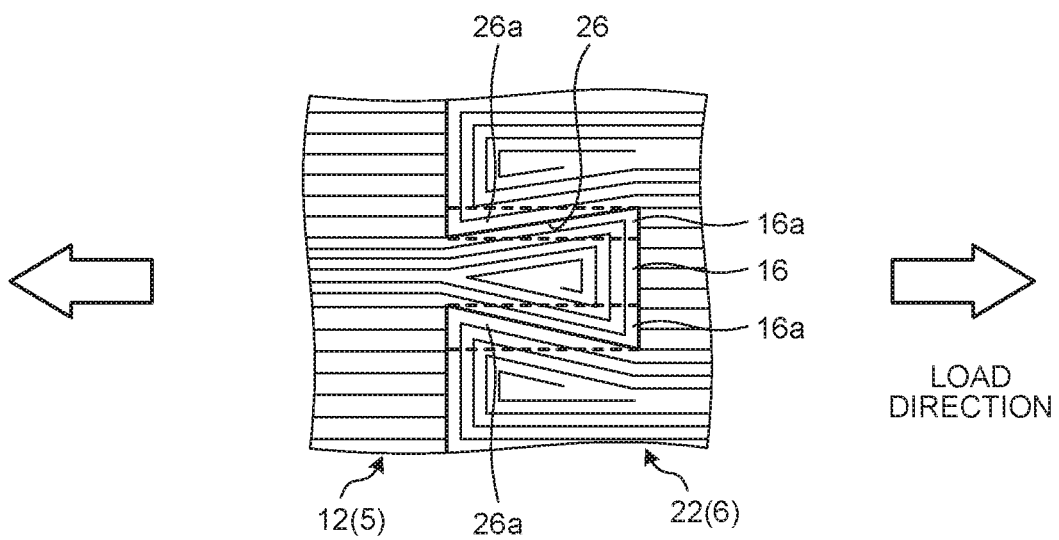
FIG. 5 is a diagram schematically illustrating an example of an orientation pattern of reinforcement fibers in joint parts.
Figure 6:
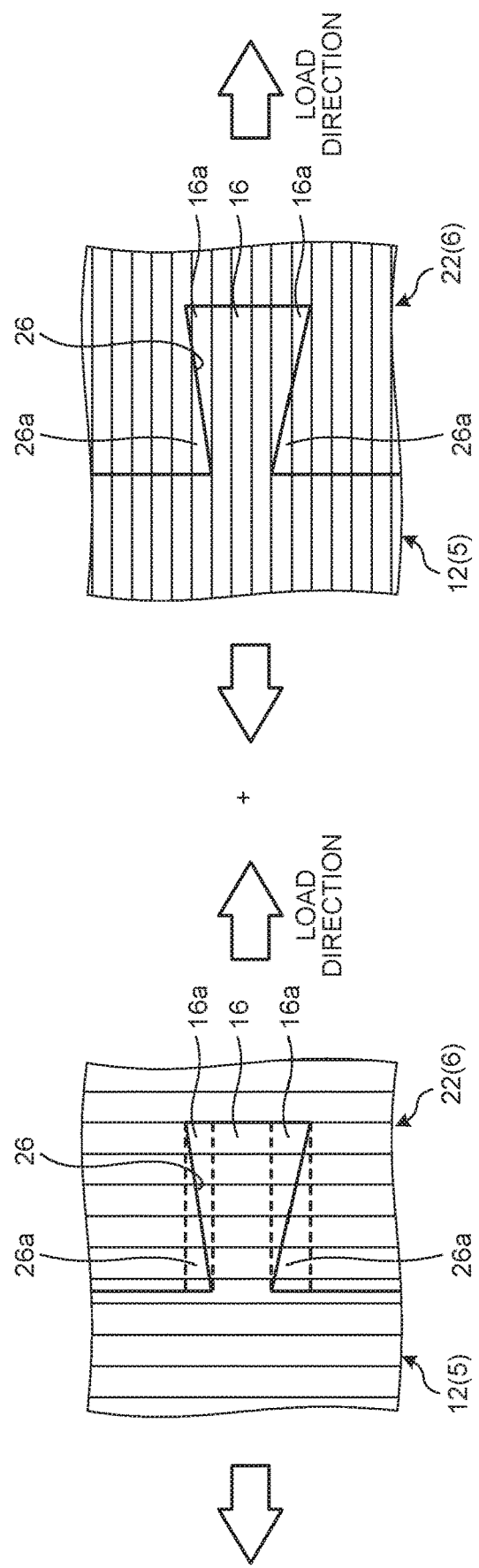
FIG. 6 is a diagram schematically illustrating an example of the orientation pattern of reinforcement fibers in the joint parts.
Figure 7:
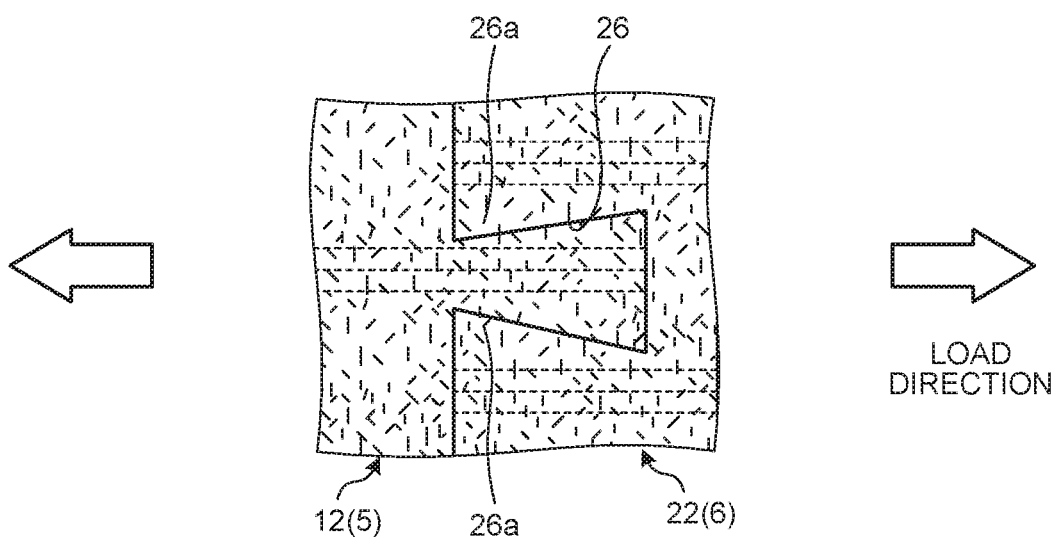
FIG. 7 is a diagram schematically illustrating an example of the orientation pattern of reinforcement fibers in the joint parts.

FIG. 1 illustrates four orthogonal views of one of joint members forming a joint structure according to a first embodiment. FIG. 2 illustrates four orthogonal views of the other of the joint members forming the joint structure according to the first embodiment. FIG. 3 is an explanatory diagram illustrating joining between the one joint member and the other joint member of the joint structure according to the first embodiment. FIG. 4 is an explanatory diagram illustrating a state in which a tensile load is applied to the joint structure according to the first embodiment. FIG. 5 to FIG. 7 are diagrams schematically illustrating examples of orientation patterns of reinforcement fibers in joint parts.

Joint Structure

As illustrated in FIG. 1 to FIG. 4, the joint structure 1 includes one joint member 5 (hereinafter also simply referred to as "joint member 5") and the other joint member 6 (hereinafter also simply referred to as "joint member 6"). The composite includes resin and reinforcement fibers. For example, thermosetting resin, thermoplastic resin, or the like is used as the resin, and carbon fibers, glass fibers, aramid fibers, or the like are used as the reinforcement fibers. In the first embodiment, carbon fiber-reinforced plastics (CFRP) are used as the composite. As illustrated in FIG. 4, a tensile load is applied to the joint structure 1, for example, in a direction in which one joint member 5 and the other joint member 6 are separated from each other.

Joint Member

FIG. 1 illustrates one joint member 5. The joint member 5 includes a main body part 11 and a joint part 12 connecting with the main body part 11 and to be joined to the other joint member 6. The main body part 11 is formed in a square tube shape with one direction serving as a longitudinal direction. Specifically, the main body part 11 has a hollow structure with an inside having a square tube shape. One end part in the longitudinal direction of the main body part 11 is provided with the joint part 12.

The joint part 12 is formed in a projecting shape projecting from the main body part 11 outward in the longitudinal direction. Specifically, the joint part 12 includes two joining surfaces 15 and two projecting parts 16 projecting from the respective joining surfaces 15. The two joining surfaces 15 are inclined toward the other end side in the longitudinal direction as it extends toward the outside, with the center line of the joint part 12 serving as the boundary, in a horizontal plane orthogonal to the longitudinal direction, and have a mountain shape. The two projecting parts 16 serve as projections projecting toward the outside in the longitudinal direction, with respect to the two inclined joining surfaces 15. The projecting parts 16 project toward respective recessed parts 26 described later. Each of the two projecting parts 16 is formed to have a short length (narrow width) in the width direction orthogonal to the longitudinal direction, on the base end side in the longitudinal direction, and have a long length (broad width) in the width direction, on the tip side in the longitudinal direction. For this reason, each of the projecting parts 16 is provided with a bulging part 16a bulging toward the recessed part 26 in the longitudinal direction (load direction) opposed to the recessed part 26 described later. In addition, in a horizontal plane orthogonal to the longitudinal direction, the tip side of each of the two projecting parts 16 is formed to have a short length (narrow width) on one side (lower side in FIG. 1) in a horizontal direction, and have a long length (broad width) on the other side (upper side in FIG. 1) in the horizontal direction. As described above, the projecting parts 16 provided with the bulging parts 16a have a dovetail shape.

FIG. 2 illustrates the other joint member 6. In the same manner as the joint member 5, the joint member 6 includes a main body part 21 and a joint part 22 connecting with the main body part 21 and to be joined to the joint part 12 of the joint member 5. The main body part 21 of the joint member 6 is the same as the main body part 11 of the joint member 5, and an explanation thereof will be omitted.

The joint part 22 is formed in a recessed shape recessed inward from the main body part 21 in the longitudinal direction, and in a complementary shape to the joint part 12 of the joint member 5. Specifically, the joint part 22 includes two joining surfaces 25 and two recessed parts 26 recessed with respect to the respective joining surfaces 25. The two joining surfaces 25 are inclined toward one end side in the longitudinal direction as it extends toward the outside, with the center line of the joint part 22 serving as the boundary, in a horizontal plane orthogonal to the longitudinal direction, and have a valley shape. The two recessed parts 26 serve as grooves recessed toward the inside in the longitudinal direction, with respect to the two inclined joining surfaces 25. The recessed parts 26 are recessed toward a side opposite to the projecting parts 16. Each of the two recessed parts 26 is formed to have a short length (narrow width) in the width direction orthogonal to the longitudinal direction, on the opening end side in the longitudinal direction, and have a long length (broad width) in the width direction, on the bottom end side in the longitudinal direction. For this reason, each of the recessed parts 26 is provided with a bulging part 26a bulging toward the projecting part 16 in the longitudinal direction (load direction) opposed to the projecting part 16. In addition, in a horizontal plane orthogonal to the longitudinal direction, the bottom end side of each of the two recessed parts 26 is formed to have a short length (narrow groove width) on one side (lower side in FIG. 2) in the horizontal direction, and have a long length (broad groove width) on the other side (upper side in FIG. 2) in the horizontal direction. As described above, the recessed parts 26 provided with the bulging parts 26a have a dovetail shape (dovetail groove).

The joint member 5 and the joint member 6 as described above are formed using, for example, a three-dimensional molding device. In the case of molding the joint members 5 and 6, unit layers are each formed using a composite including resin and fibers, and the unit layers are laid up to form a laminate. The joint member 5 and the joint member 6 may be molded by, for example, injection molding. In the case of molding the joint members 5 and 6 by injection molding, it is required to adopt the shapes of the joint members 5 and 6 enabling injection molding, and use reinforcement fibers enabling formation of an anisotropic orientation pattern described later (for example, FIG. 7).

Joining of Joint Members

In the joint member 5 and the joint member 6 formed described above, the fitting direction in which the joint part 22 is relatively moved with respect to the joint part 12 to join the joint parts 12 and 22 is a direction different from the load direction, as illustrated in FIG. 3. Specifically, the fitting direction of the joint parts 12 and 22 is an in-plane direction of one pair of overlapping joining surfaces 15 and 25. The one pair of joining surfaces 15 and 25 herein are a pair of the joining surfaces 15 and 25 that are respectively provided with the projecting part 16 and the recessed part 26 that are narrow on the center line side in the horizontal plane orthogonal to the longitudinal direction. For this reason, the joint parts 12 and 22 have shapes allowing relative movement in the fitting direction.

Orientation Patterns of Joint Parts

The following describes orientation patterns of reinforcement fibers in the projecting parts 16 of the joint part 12 and the recessed parts 26 of the joint part 22 with reference to FIG. 5 to FIG. 7. The orientation patterns of the reinforcement fibers illustrated in FIG. 5 to FIG. 7 have anisotropy (anisotropic property) in which the fiber directions of the reinforcement fibers include a fiber direction different from the load direction.

FIG. 5 illustrates an orientation pattern in which the reinforcement fibers are provided along the external shapes of the joint parts 12 and 22, and the reinforcement fibers are wound toward the inside of the joint parts 12 and 22. Specifically, in FIG. 5, the reinforcement fibers included in the projecting part 16 of the joint part 12 includes reinforcement fibers formed in such a manner of circling along the external shape of the projecting part 16 having the bulging part 16a, and reinforcement fibers wound and provided inside the reinforcement fibers extending along the external shape. In the same manner, the reinforcement fibers included in the recessed part 26 of the joint part 22 include reinforcement fibers formed in such a manner of circling along the external shape of the recessed part 26 having the bulging part 26a, and reinforcement fibers wound and provided inside the reinforcement fibers extending along the external shape. For this reason, the orientation pattern of the reinforcement fibers of the projecting part 16 and the recessed part 26 illustrated in FIG. 5 have anisotropy. In addition, even when the tensile load is applied in a direction (longitudinal direction) in which the joint parts 12 and 22 are separated from each other, the orientation pattern has anisotropy capable of enduring the tensile load, because the fiber directions of the reinforcement fibers in the bulging parts 16a and 26a cross the load direction.

FIG. 6 illustrates an orientation pattern in which a plurality of layers of reinforcement fibers are laid up and the fiber directions of each layer are aligned in one direction. Specifically, the reinforcement fiber layers include a layer (the left layer in FIG. 6) having a fiber direction that coincides with a direction orthogonal to the load direction. In the case of forming the joint parts 12 and 22 only of the layer illustrated in the left part of FIG. 6, delamination may occur on the base end side of the projecting part 16, although it can endure the tensile load in the bulging parts 16a and 26a. For this reason, the reinforcement fiber layers may include a layer (the right layer in FIG. 6) having a fiber direction that coincides with a direction extending along the load direction. In this state, regardless of the ratio of the layer illustrated in the left part of FIG. 6 to the layer illustrated in the right part of FIG. 6, the orientation pattern of the reinforcement fibers of the projecting part 16 and the recessed part 26 illustrated in FIG. 6 has anisotropy. In addition, even when the tensile load is applied in the direction (longitudinal direction) in which the joint parts 12 and 22 are separated from each other, the orientation pattern has anisotropy capable of enduring the tensile load, because the fiber directions of the reinforcement fibers in the bulging parts 16a and 26a cross the load direction.

FIG. 7 illustrates an orientation pattern in which discontinuous reinforcement fibers including thermoplastic resin are oriented intentionally. Specifically, in FIG. 7, the reinforcement fibers included in the projecting part 16 of the joint part 12 are scattered in the bulging part 16a on both sides in the width direction of the projecting part 16 and extend along the load direction in parts other than the bulging part 16a in the center in the width direction of the projecting part 16. For this reason, the orientation pattern of the reinforcement fibers of the projecting part 16 and the recessed part 26 illustrated in FIG. 7 has anisotropy. In addition, even when the tensile load is applied in the direction (longitudinal direction) in which the joint parts 12 and 22 are separated from each other, the orientation pattern has anisotropy capable of enduring the tensile load, because the reinforcement fibers in the bulging parts 16a and 26a have fiber directions scattered with respect to the load direction.

As described above, according to the first embodiment, the joint parts 12 and 22 include the bulging parts 16a and 26a bulging toward the opposed joint parts 12 and 22, in the opposed direction (longitudinal direction) in which the joint parts 12 and 22 are opposed to each other, and have an orientation pattern having anisotropy such that the fiber directions of the reinforcement fibers included in the joint parts 12 and 22 include a direction different from the load direction of the load applied to a joined portion between the joint parts 12 and 22. This structure hinders occurrence of damage, such as breakage, in the bulging parts 16a and 26a of the joint parts 12 and 22, even when a load is applied in the longitudinal direction, and enables proper maintenance of the joined state of the joint members 5 and 6.

In addition, according to the first embodiment, the joint part 12 includes the projecting part 16 projecting toward the joint part 22, and the bulging part 16a of the projecting part 16 bulges outward toward the joint part 22. Even the joint part 12 including the projecting part 16 described above hinders occurrence of damage, such as breakage, in the bulging parts 16a, and thereby the joined state of the joint members 5 and 6 can be maintained properly.

In addition, according to the first embodiment, the joint part 22 includes the recessed part 26 recessed toward the side opposite to the joint part 12, and the bulging part 26a of the recessed part 26 bulges outward toward the joint part 22. Even the joint part 22 including the recessed parts 26 as described above hinders occurrence of damage, such as breakage, in the bulging parts 26a, and thereby the joined state of the joint members 5 and 6 can be maintained properly.

In addition, according to the first embodiment, the joint parts 12 and 22 have an orientation pattern in which reinforcement fibers are provided along the external shapes of the joint parts 12 and 22 and the reinforcement fibers are wound toward the inside of the joint parts 12 and 22, as the orientation pattern having anisotropy. This structure enables increase in tensile strength in the bulging parts 16a and 26a of the joint parts 12 and 22.

In addition, according to the first embodiment, the joint parts 12 and 22 have an orientation pattern in which a layer having a fiber direction extending along the load direction and a layer having a fiber direction crossing the load direction are laid up, as the orientation pattern having anisotropy. This structure simplifies the fiber orientation in the joint parts 12 and 22 and enables easy formation of an orientation pattern having anisotropy.

In addition, according to the first embodiment, the joint parts 12 and 22 have an orientation pattern in which discontinuous reinforcement fibers have fiber directions scattered in the bulging parts 16a and 26a, as the orientation pattern having anisotropy. This structure simplifies the fiber orientation in the bulging parts 16a and 26a and enables easy formation of an orientation pattern having anisotropy.

In addition, according to the first embodiment, each of the main body parts 11 and 21 has a hollow structure. This structure enables reduction in weight of the joint members 5 and 6.

In addition, according to the first embodiment, the fitting direction to join the joint parts 12 and 22 is a direction different from the load direction, and each of the joint parts 12 and 22 has a shape allowing movement in the fitting direction. This structure enables proper maintenance of the joined state of the joint members 5 and 6 without release of fitting of the joint members 5 and 6, even when a load is applied in the load direction.

Second Embodiment

Figure 8:
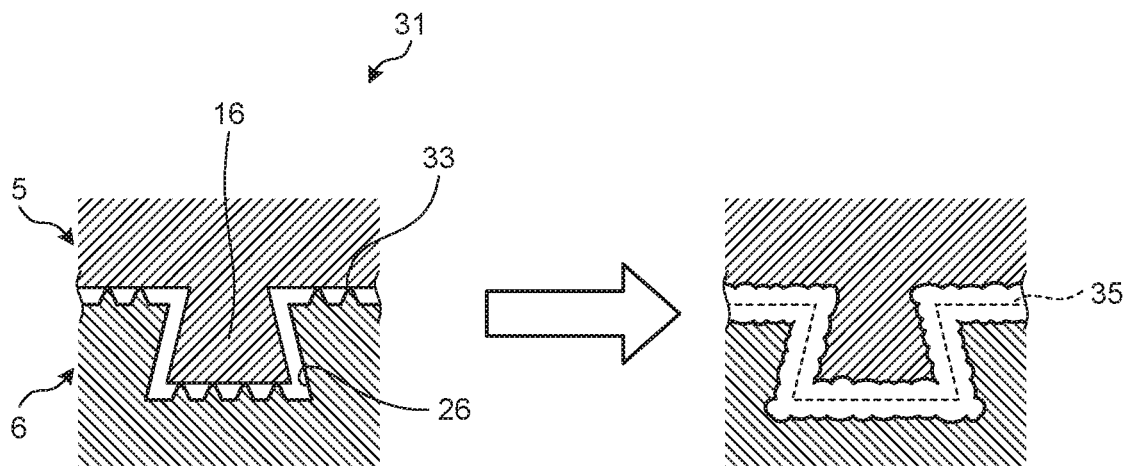
FIG. 8 is a diagram schematically illustrating part of a joint structure according to a second embodiment.

The following describes a joint structure 31 according to a second embodiment, with reference to FIG. 8. To avoid overlapping descriptions, the second embodiment describes parts different from those of the first embodiment, and parts having the same structures as those of the first embodiment will be described with the same reference numerals. FIG. 8 is a diagram schematically illustrating part of the joint structure according to the second embodiment.

The joint structure 31 according to the second embodiment has a structure in which the joint member 6 having recessed parts 26 is provided with energy directors 33 on external surfaces (front surfaces) of the joining surfaces 25 and the recessed parts 26. The energy director 33 includes resin and is molten by friction with the projecting parts 16 by vibration using ultrasonic waves or the like. In the state in which the joint member 5 is fitted with the joint member 6, when the joint member 5 and the joint member 6 relatively vibrate, the energy directors 33 are molten to form a welding layer 35, and the joint part 12 of the joint member 5 is welded to the joint part 22 of the joint member 6.

As described above, according to the second embodiment, the joint part 12 of the joint member 5 can be welded to the joint part 22 of the joint member 6. This structure further strengthens joining between the joint members 5 and 6.

While the joint member 6 including the recessed parts 26 is provided with the energy directors 33 in the second embodiment, the joint member 5 including the projecting parts 16 may be provided with the energy directors 33, and the structure is not limited thereto.

In addition, while the energy directors 33 are provided in order to further strengthen joining between the joint members 5 and 6 in the second embodiment, the structure is not limited thereto. For example, a volume-increase adhesive may be used, and the adhesive may be injected into a space between the joint part 12 of the joint member 5 and the joint part 22 of the joint member 6 to form an adhesive layer between the joint part 12 of the joint member 5 and the joint part 22 of the joint member 6. As another example, the joint members 5 and 6 may be joined by shrink fit in which the joint members 5 and 6 are cooled and shrunk and then the joint part 12 of the joint member 5 is fitted with the joint part 22 of the joint member 6.

Third Embodiment

Figure 9:
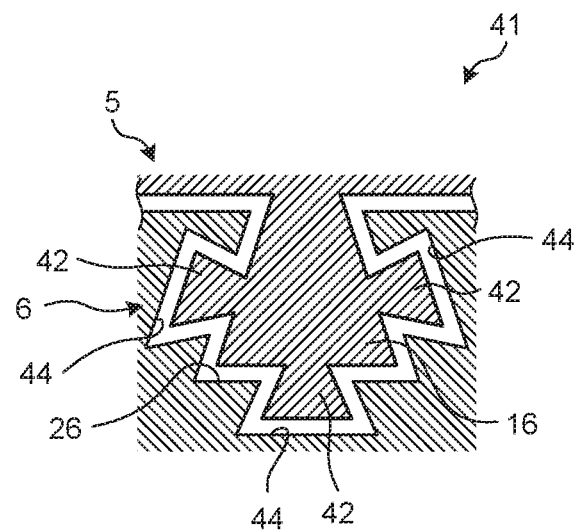
FIG. 9 is a diagram schematically illustrating part of a joint structure according to a third embodiment.

The following describes a joint structure 41 according to a third embodiment, with reference to FIG. 9. To avoid overlapping descriptions, the third embodiment also describes parts different from those of the first and the second embodiments, and parts having the same structures as those of the first and the second embodiments will be described with the same reference numerals. FIG. 9 is a diagram schematically illustrating part of the joint structure according to the third embodiment.

The joint structure 41 according to the third embodiment has a structure in which the shapes of the projecting parts 16 and the recessed parts 26 of the joint member 5 and the joint member 6 are different from the shapes thereof in the first embodiment. Each of the projecting parts 16 is provided with a plurality of auxiliary projecting parts 42 projecting from the projecting part 16. In addition, each of the recessed parts 26 having shapes complementary to the respective projecting parts 16 is provided with a plurality of auxiliary recessed parts 44 recessed from the recessed part 26. The projecting parts 16 and the recessed parts 26 have fractal shapes.

As described above, in the third embodiment, the projecting parts 16 of the joint member 5 are provided with the auxiliary projecting parts 42, and the recessed parts 26 of the joint member 6 are provided with the auxiliary recessed parts 44. This structure further strengthens joining between the joint members 5 and 6.

Fourth Embodiment

The following describes a joint structure 51 according to a fourth embodiment, with reference to FIG. 10. To avoid overlapping descriptions, the fourth embodiment also describes parts different from those of the first to the third embodiments, and parts having the same structures as those of the first to the third embodiments will be described with the same reference numerals. FIG. 10 is a diagram schematically illustrating the joint structure according to the fourth embodiment.

The joint structure 51 according to the fourth embodiment further includes, in addition to the joint structure 1 according to the first embodiment, positioning pins 55 serving as positioning members determining the positions of the joint part 12 of the joint member 5 and the joint part 22 of the joint member 6 that are joined.

Each of the positioning pins 55 has a cylindrical shape and is provided so as to penetrate through the joint member 5 and the joint member 6 that are joined. The joint part 12 of the joint member 5 is provided with through holes 53 through which the positioning pins 55 are inserted. In the same manner, the joint part 22 of the joint member 6 is provided with through holes 54 through which the positioning pins 55 are inserted. The through holes 53 and 54 are formed to be aligned in the through direction when the joint members 5 and 6 are joined. The through holes 53 are formed, for example, in the projecting parts 16 of the joint part 12 so as to penetrate the projecting parts 16 in a direction orthogonal to the load direction and the fitting direction. In the same manner, the through holes 54 are formed, for example, in the recessed parts 26 of the joint part 22 so as to penetrate the recessed parts 26 in the direction orthogonal to the load direction and the fitting direction.

As described above, the structure of the fourth embodiment further includes the positioning pins 55 determining the positions of the joint part 12 of the joint member 5 and the joint part 22 of the joint member 6 that are joined. This structure further strengthens joining between the joint members 5 and 6.

Fifth Embodiment

Figure 11:
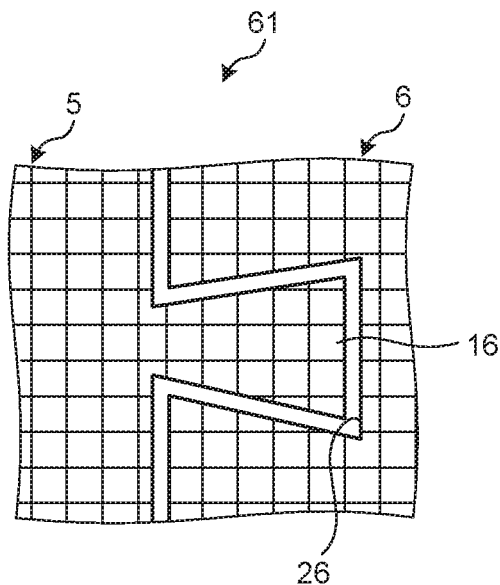
FIG. 11 is a diagram schematically illustrating part of a joint structure according to a fifth embodiment.

The following describes a joint structure 61 according to a fifth embodiment, with reference to FIG. 11. To avoid overlapping descriptions, the fifth embodiment also describes parts different from those of the first to the fourth embodiments, and parts having the same structures as those of the first to the fourth embodiments will be described with the same reference numerals. FIG. 11 is a diagram schematically illustrating part of the joint structure according to the fifth embodiment.

The joint structure 61 according to the fifth embodiment has a structure in which the joint member 5 and the joint member 6, that is, the main body parts 11 and 21 and the joint parts 12 and 22, have a framed structure formed of a plurality of frame members 62. The frame members 62 are formed to extend in the longitudinal direction and formed of a composite having a fiber direction of the reinforcement fibers that coincides with the longitudinal direction. In addition, the frame members 62 include frame members 62 having the longitudinal direction that coincides with the load direction, and frame members 62 having the longitudinal direction that coincides with a direction orthogonal to the load direction. The frame members 62 are arranged to have a lattice structure. The frame members 62 may be arranged to have a truss structure.

The frame members 62 have an orientation pattern having anisotropy in the joint parts 12 and 22. Specifically, in the frame members 62, the proportion of frame members 62 having the longitudinal direction that coincides with the load direction is different from the proportion of frame members 62 having the longitudinal direction that coincide with a direction orthogonal to the load direction. For example, in the frame members 62, the proportion of the frame members 62 having the longitudinal direction that coincides with a direction orthogonal to the load direction are greater than that of the frame members 62 having the longitudinal direction that coincides with the load direction. The physical quantity to be used to obtain the proportion may be the total length of the frame members 62, the total volume of the frame members 62, or the total weight of the frame members 62.

As described above, according to the fifth embodiment, the main body parts 11 and 21 and the joint parts 12 and 22 have a framed structure formed of a plurality of frame members 62, and the joint parts 12 and 22 have an orientation pattern in which the reinforcement fibers are provided along the longitudinal direction of the frame members 62, as the orientation pattern having anisotropy. This structure hinders occurrence of damage to the joint parts 12 and 22 even when a load is applied in the longitudinal direction and enables proper maintenance of the joined state of the joint members 5 and 6. In addition, because the joint structure 61 acquired by joining the joint members 5 and 6 has a framed structure, a strong structure can be formed by uniting the matrix formed of resin, concrete, or the like.

Sixth Embodiment

Figure 12:
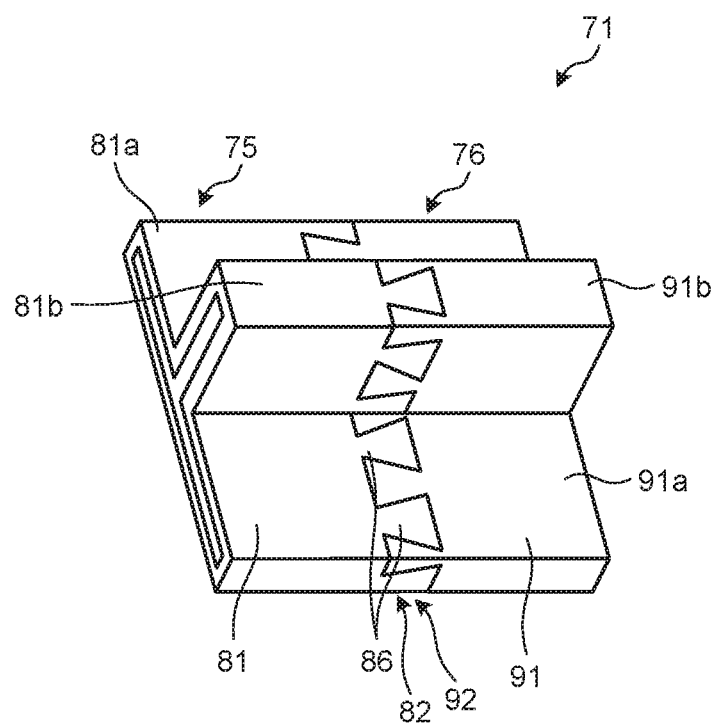
FIG. 12 is a perspective view illustrating a joint structure according to a sixth embodiment.
Figure 13:
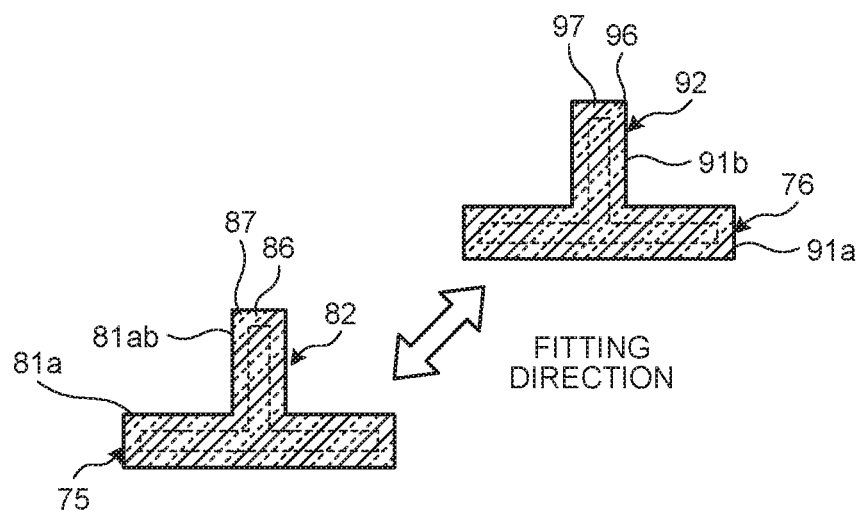
FIG. 13 is an explanatory diagram illustrating joining between one joint member and the other joint member of the joint structure according to the sixth embodiment.

The following describes a joint structure 71 according to a sixth embodiment, with reference to FIG. 12 and FIG. 13.

To avoid overlapping descriptions, the sixth embodiment also describes parts different from those of the first to the fifth embodiments, and parts having the same structures as those of the first to the fifth embodiments will be described with the same reference numerals. FIG. 12 is a perspective view illustrating the joint structure according to the sixth embodiment. FIG. 13 is an explanatory diagram illustrating joining between one joint member and the other joint member of the joint structure according to the sixth embodiment.

Joint Structure

The joint structure 71 according to the sixth embodiment has a structure in which joint members 75 and 76 each having a T-shaped longitudinal section are joined. In the same manner as the first embodiment, the joint structure 71 according to the sixth embodiment is provided with a tensile load in a direction in which one joint member 75 and the other joint member 76 are separated from each other.

Joint Members

The joint member 75 includes a main body part 81 and a joint part 82 connecting with the main body part 81 and to be joined to the other joint member 76. The main body part 81 is formed to extend in the longitudinal direction and formed in a T shape formed of a flange 81a and a rib part 81b in a section taken with a plane orthogonal to the longitudinal direction. The rib part 81b projects outward from the center in the width direction of the flange 81a. The inside of the main body part 81 has a hollow structure. One end part in the longitudinal direction of the main body part 81 is provided with the joint part 82.

As illustrated in FIG. 13, the joint part 82 is formed as a joint including a projecting part 86 and a recessed part 87 having a dovetail shape, and the projecting part 86 and the recessed part 87 in the joint part 82 are formed to extend in an oblique direction connecting the flange 81a and the rib part 81b, in a plane orthogonal to the load direction (longitudinal direction). For this reason, the projecting part 86 and the recessed part 87 of the joint part 82 are formed such that part of them is discontinuous. The shapes of the projecting part 86 and the recessed part 87 are dovetail shapes in the same manner as the first embodiment and include bulging parts.

Like the joint member 75, the joint member 76 includes a main body part 91 and a joint part 92 connecting with the main body part 91 and to be joined to the other joint member 75. The main body part 91 of the joint member 76 is formed in a T shape formed of a flange 91a and a rib part 91b, in the same manner as the main body part 81 of the joint member 75, and an explanation thereof will be omitted.

As illustrated in FIG. 13, the joint part 92 is formed as a joint formed of a projecting part 96 and a recessed part 97 having a dovetail shape, and the projecting part 96 and the recessed part 97 in the joint part 92 are formed to extend in an oblique direction connecting the flange 91a and the rib part 91b, in a plane orthogonal to the load direction (longitudinal direction). For this reason, like the joint member 75, the projecting part 96 and the recessed part 97 of the joint part 92 are formed such that part of them is discontinuous. The shapes of the projecting part 96 and the recessed part 97 are dovetail shapes in the same manner as the first embodiment and include bulging parts.

Joining of Joint Members

In the joint member 75 and the joint member 76 formed described above, the fitting direction in which the joint part 92 is relatively moved with respect to the joint part 82 to join the joint parts 82 and 92 is a direction different from the load direction, as illustrated in FIG. 13. Specifically, the fitting direction of the joint parts 82 and 92 coincides with the oblique direction in which the projecting parts 86 and 96 and the recessed parts 87 and 97 extend. In this state, because part of the projecting parts 86 and 96 and the recessed parts 87 and 97 is formed discontinuous, when the joint members 75 and 76 are joined, for example, the projecting part 86 in the hatched portion illustrated in FIG. 13 is fitted across the discontinuous recessed part 97 in the hatched portion.

As described above, according to the sixth embodiment, the joined state of the joint members 75 and 76 can be maintained properly, even when the joint member 75 and the joint member 76 have T shapes formed of the flanges 81a and 91a and the rib parts 81b and 91b.

Seventh Embodiment

Figure 14:
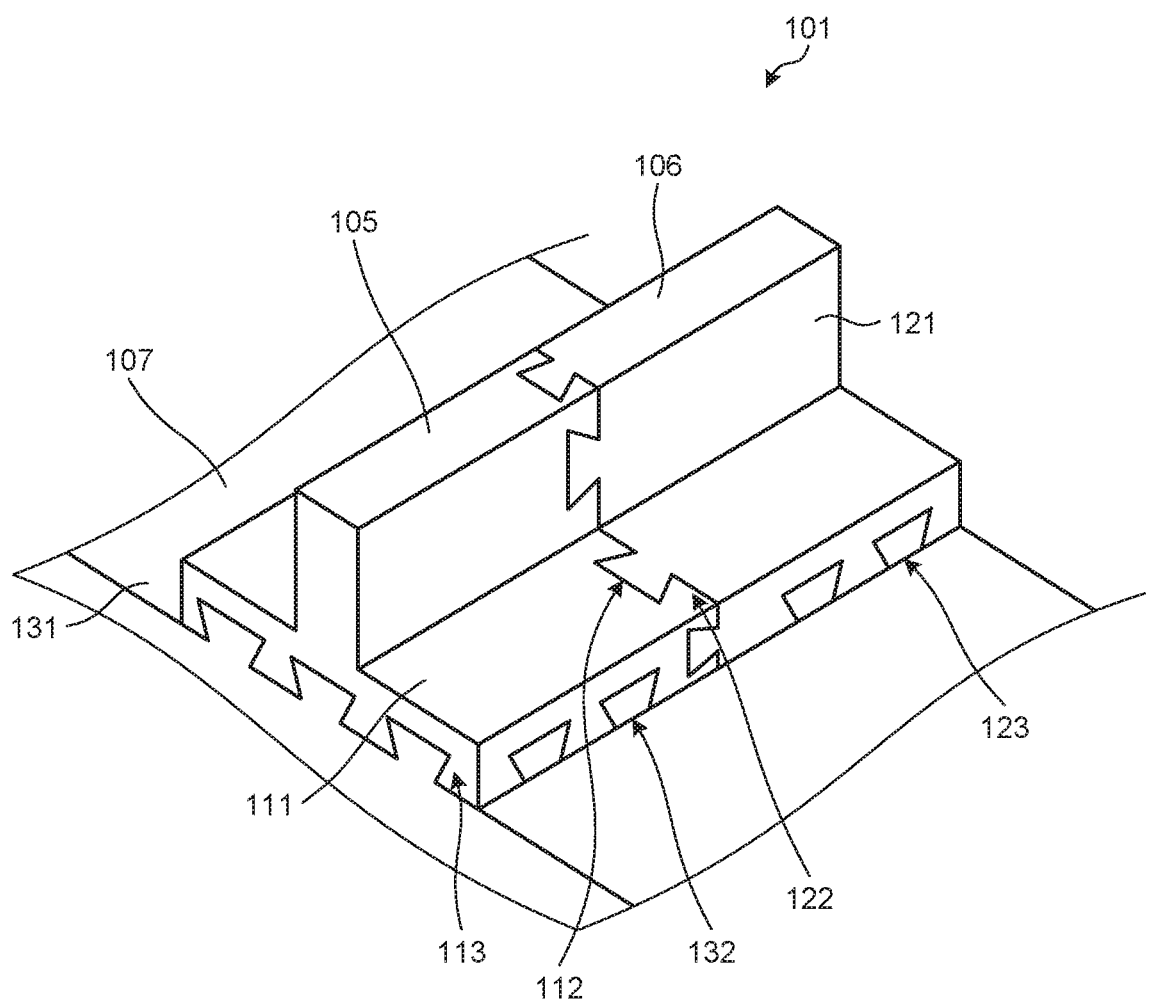
FIG. 14 is a perspective view illustrating a joint structure according to a seventh embodiment.

The following describes a joint structure 101 according to a seventh embodiment, with reference to FIG. 14. To avoid overlapping descriptions, the seventh embodiment also describes parts different from those of the first to the sixth embodiments, and parts having the same structures as those of the first to the sixth embodiments will be described with the same reference numerals. FIG. 14 is a perspective view illustrating the joint structure according to the seventh embodiment.

Joint Structure

The joint structure 101 according to the seventh embodiment is acquired by joining three joint members. As illustrated in FIG. 14, the joint structure 101 includes a joint member 105, a joint member 106, and a joint member 107.

Joint Members

The joint member 105 and the joint member 106 are acquired by forming a joint part 113 and a joint part 123 in the joint member 75 and the joint member 76 of the sixth embodiment, respectively. Specifically, the joint member 105 includes a main body part 111, a joint part 112 connecting with the main body part 111 and to be joined to the joint member 106, and the joint part 113 connecting with the main body part 111 and to be joined to the joint member 107. The main body part 111 and the joint part 112 are the same as the main body part 81 and the joint part 82 of the joint member 75 according to the sixth embodiment, and an explanation thereof will be omitted. The joint part 113 is formed in a plane opposed to the joint member 107. The joint part 113 is formed as a joint including a projecting part and a recessed part having dovetail shapes, and formed to extend in a direction different from the load direction (longitudinal direction) and the fitting direction of fitting with the joint member 106. The shapes of the projecting part and the recessed part of the joint part 113 are dovetail shapes in the same manner as the first embodiment and have bulging parts.

The joint member 106 includes a main body part 121, a joint part 122 connecting with the main body part 121 and to be joined to the joint member 105, and the joint part 123 connecting with the main body part 121 and to be joined to the joint member 107. The main body part 121 and the joint part 122 are the same as the main body part 91 and the joint part 92 of the joint member 76 according to the sixth embodiment, and an explanation thereof will be omitted. The joint part 123 is formed in a plane opposed to the joint member 107. The joint part 123 is formed as a joint formed of a projecting part and a recessed part having dovetail shapes, and formed to extend in a direction different from the load direction (longitudinal direction) and the fitting direction of fitting with the joint member 105. The shapes of the projecting part and the recessed part of the joint part 123 are dovetail shapes in the same manner as the first embodiment and have bulging parts. In addition, the projecting part and the recessed part of the joint part 113 and the projecting part and the recessed part of the joint part 123 are formed to be continuous in the extending direction.

The joint member 107 includes a main body part 131 and a joint part 132 connecting with the main body part 131 and to be joined to the joint member 105 and the joint member 106. The main body part 131 is formed in a flat plate shape. The joint part 132 is formed in a plane opposed to the joint member 105 and the joint member 106 to be joined. The joint part 132 is formed as a joint formed of a projecting part and a recessed part having dovetail shapes, and formed to extend in a direction different from the load direction (longitudinal direction), the fitting direction of fitting with the joint member 105, and the fitting direction of fitting with the joint member 106. The shapes of the projecting part and the recessed part of the joint part 132 are dovetail shapes in the same manner as the first embodiment, and have bulging parts.

Joining of Joint Member

The joint member 105, the joint member 106, and the joint member 107 formed as described above are joined such that, first, the joint member 105 and the joint member 106 are joined, and thereafter the joint member 107 is joined to the joint member 105 and the joint member 106. In the joining, the fitting direction of the joint member 105 and the joint member 106 is different from the fitting direction of the joint member 107 and the joint members 105 and 106, and the fitting directions are also different from the load direction.

As described above, according to the seventh embodiment, even when the three joint members 105, 106, and 107 are joined, the joint member 105 can be provided with two joint parts 112 and 113, the joint member 106 can be provided with two joint parts 122 and 123, and the fitting directions corresponding to the joint parts can be set in mutually different directions. Thus, in the case of joining the three joint members 105, 106, and 107, the joined state of the joint members 105, 106, and 107 can be maintained properly even when a load, such as a tensile load, is applied.

The joint members and the joint structures described in the embodiments are understood, for example, as follows.

The joint members 5, 6, 75, 76, 105, 106, and 107 of a composite according to a first aspect are joint members 5, 6, 75, 76, 105, 106, and 107 of a composite including reinforcement fibers and resin and joined to joining parts (joint parts) 12, 22, 82, 92, 112, 113, 122, 123, and 132. The joint members 5, 6, 75, 76, 105, 106, and 107 include the main body parts 11, 21, 81, 91, 111, 121, and 131 and the joint parts 12, 22, 82, 92, 112, 113, 122, 123, and 132 connecting with the main body parts 11, 21, 81, 91, 111, 121, and 131 and to be joined to the joining parts 12, 22, 82, 92, 112, 113, 122, 123, and 132. The joint parts 12, 22, 82, 92, 112, 113, 122, 123, and 132 include bulging parts 16a and 26a bulging toward the joining parts 12, 22, 82, 92, 112, 113, 122, 123, and 132 in an opposed direction in which the joint parts are opposed to the joining parts 12, 22, 82, 92, 112, 113, 122, 123, and 132, and have an orientation pattern having anisotropy such that the fiber directions of the reinforcement fibers included in the joint parts 12, 22, 82, 92, 112, 113, 122, 123, and 132 include fiber directions different from the load direction of a load applied to a joined portion of the joint parts 12, 22, 82, 92, 112, 113, 122, 123, and 132 and the joining parts 12, 22, 82, 92, 112, 113, 122, 123, and 132.

This structure enables to exhibit high tensile strength in the bulging parts 16a and 26a of the joint parts 12, 22, 82, 92, 112, 113, 122, 123, and 132.

In the joint members 5, 6, 75, 76, 105, 106, and 107 of a composite according to a second aspect, the joint parts 12, 22, 82, 92, 112, 113, 122, 123, and 132 are projections (projecting parts) 86 and 96 projecting toward the joining parts 12, 22, 82, 92, 112, 113, 122, 123, and 132, and the bulging parts 16a and 26a of the projections 86 and 96 bulge outward toward the joining parts 12, 22, 82, 92, 112, 113, 122, 123, and 132.

This structure enables to exhibit higher tensile strength in the bulging parts 16a and 26a of the joint parts 12, 22, 82, 92, 112, 113, 122, 123, and 132.

In the joint members 5, 6, 75, 76, 105, 106, and 107 of a composite according to a third aspect, the joint parts 12, 22, 82, 92, 112, 113, 122, 123, and 132 are grooves (recessed parts) 87 and 97 recessed in a direction opposite to the joining parts 12, 22, 82, 92, 112, 113, 122, 123, and 132, and the bulging parts 16a and 26a of the grooves 87 and 97 narrow inward toward the joining parts 12, 22, 82, 92, 112, 113, 122, 123, and 132.

This structure enables to exhibit higher tensile strength in the bulging parts 16a and 26a of the joint parts 12, 22, 82, 92, 112, 113, 122, 123, and 132.

In the joint members 5, 6, 75, 76, 105, 106, and 107 of a composite according to a fourth aspect, the joint parts 12, 22, 82, 92, 112, 113, 122, 123, and 132 have an orientation pattern in which the reinforcement fibers are provided along the external shape of the joint parts 12, 22, 82, 92, 112, 113, 122, 123, and 132 and the reinforcement fibers are wound toward the inside of the joint parts 12, 22, 82, 92, 112, 113, 122, 123, and 132, as the orientation pattern having anisotropy.

This structure enables to exhibit higher tensile strength in the bulging parts 16a and 26a of the joint parts 12, 22, 82, 92, 112, 113, 122, 123, and 132.

In the joint members 5, 6, 75, 76, 105, 106, and 107 of a composite according to a fifth aspect, the reinforcement fibers have fiber directions each of which is aligned in one direction, and the joint parts 12, 22, 82, 92, 112, 113, 122, 123, and 132 have an orientation pattern in which a layer having a fiber direction extending along the load direction and a layer having a fiber direction crossing the load direction are laid up, as the orientation pattern having anisotropy.

This structure simplifies the fiber orientations in the joint parts 12, 22, 82, 92, 112, 113, 122, 123, and 132 and enables easy formation of the orientation pattern having anisotropy.

In the joint members 5, 6, 75, 76, 105, 106, and 107 of a composite according to a sixth aspect, the reinforcement fibers are discontinuous reinforcement fibers, and the joint parts 12, 22, 82, 92, 112, 113, 122, 123, and 132 have an orientation pattern in which the reinforcement fibers have fiber directions scattered in the bulging parts 16a and 26a, as the orientation pattern having anisotropy.

This structure simplifies the fiber orientation in the bulging parts 16a and 26a and enables easy formation of the orientation pattern having anisotropy.

In the joint members 5, 6, 75, 76, 105, 106, and 107 of a composite according to a seventh aspect, each of the main body parts 11, 21, 81, 91, 111, 121, and 131 has a hollow structure.

This structure enables reduction in weight of the joint members 5, 6, 75, 76, 105, 106, and 107.

In the joint members 5, 6, 75, 76, 105, 106, and 107 of a composite according to an eighth aspect, each of the main body parts 11, 21, 81, 91, 111, 121, and 131 and the joint parts 12, 22, 82, 92, 112, 113, 122, 123, and 132 has a framed structure formed of a plurality of frame members 62, and the joint parts 12, 22, 82, 92, 112, 113, 122, 123, and 132 have an orientation pattern in which the reinforcement fibers are provided along the longitudinal direction of the frame members 62, as the orientation pattern having anisotropy.

This structure hinders occurrence of damage to the joint parts 12, 22, 82, 92, 112, 113, 122, 123, and 132 even when a load is applied in the longitudinal direction, and thus enables proper maintenance of the joined states of the joint members 5, 6, 75, 76, 105, 106, and 107. In addition, because the joint structures 61 acquired by joining the joint members 5, 6, 75, 76, 105, 106, and 107 have a framed structure, strong structures can be formed by uniting the matrix formed of resin, concrete, or the like.

In the joint members 5, 6, 75, 76, 105, 106, and 107 of a composite according to a ninth aspect, the fitting direction in which the joint parts 12, 22, 82, 92, 112, 113, 122, 123, and 132 are moved with respect to the joining parts 12, 22, 82, 92, 112, 113, 122, 123, and 132 to join the joint parts 12, 22, 82, 92, 112, 113, 122, 123, and 132 to the joining parts 12, 22, 82, 92, 112, 113, 122, 123, and 132, is a direction different from the load direction, and the joint parts 12, 22, 82, 92, 112, 113, 122, 123, and 132 have a shape allowing movement in the fitting direction with respect to the joining parts 12, 22, 82, 92, 112, 113, 122, 123, and 132.

This structure enables proper maintenance of the joined states of the joint members 5, 6, 75, 76, 105, 106, and 107 without releasing the fitting of the joint members 5, 6, 75, 76, 105, 106, and 107, even when a load is applied in the load direction.

In the joint members 5, 6, 75, 76, 105, 106, and 107 of a composite according to a tenth aspect, a plurality of the joint parts 12, 22, 82, 92, 112, 113, 122, 123, and 132 are provided, and fitting directions corresponding to the plurality of the joint parts 12, 22, 82, 92, 112, 113, 122, 123, and 132 are mutually different directions.

This structure enables proper maintenance of the joined states of the joint members 105, 106, and 107, in the case of joining the joint members 105, 106, and 107, even when a load is applied in the load direction.

The joint structures 1, 31, 41, 51, 61, 71, and 101 according to an eleventh aspect include a plurality of the joint members 5, 6, 75, 76, 105, 106, and 107 of a composite; the joint part 12, 22, 82, 92, 112, 113, 122, 123, and 132 of one joint member 5, 6, 75, 76, 105, 106, or 107 serves as the joining part; and the joint part 12, 22, 82, 92, 112, 113, 122, 123, or 132 of the other joint member 5, 6, 75, 76, 105, 106, or 107 is joined to the joint part 12, 22, 82, 92, 112, 113, 122, 123, or 132 of the one joint member 5, 6, 75, 76, 105, 106, or 107.

This structure hinders occurrence of damage, such as breakage, in the bulging parts 16a and 26a of the joint parts 12, 22, 82, 92, 112, 113, 122, 123, and 132 even when a load is applied in the longitudinal direction, and enables proper maintenance of the joined states of the joint members 5, 6, 75, 76, 105, 106, and 107.

In the joint structures 1, 31, 41, 51, 61, 71, and 101 according to a twelfth aspect, the joint part 12, 22, 82, 92, 112, 113, 122, 123, or 132 of one joint member 5, 6, 75, 76, 105, 106, or 107 is welded to the joint part 12, 22, 82, 92, 112, 113, 122, 123, or 132 of the other joint member 5, 6, 75, 76, 105, 106, or 107.

This structure enables welding of the joint part 12, 22, 82, 92, 112, 113, 122, 123, or 132 of one joint member 5, 6, 75, 76, 105, 106, or 107 to the joint part 12, 22, 82, 92, 112, 113, 122, 123, or 132 of the joint member 5, 6, 75, 76, 105, 106, or 107. This structure further strengthens joining between the joint members 5, 6, 75, 76, 105, 106, and 107.

The joint structures 1, 31, 41, 51, 61, 71, and 101 according to a thirteenth aspect further includes an adhesive layer between the joint part 12, 22, 82, 92, 112, 113, 122, 123, or 132 of one joint member 5, 6, 75, 76, 105, 106, or 107 and the joint part 12, 22, 82, 92, 112, 113, 122, 123, or 132 of the other joint member 5, 6, 75, 76, 105, 106, or 107.

This structure further strengthens joining of the joint members 5, 6, 75, 76, 105, 106, and 107.

The joint structures 1, 31, 41, 51, 61, 71, and 101 according to a fourteenth aspect further includes a positioning member (positioning pins 55) determining positions of the joint part 12, 22, 82, 92, 112, 113, 122, 123, or 132 of one joint member 5, 6, 75, 76, 105, 106, or 107 and the joint part 12, 22, 82, 92, 112, 113, 122, 123, or 132 of the other joint member 5, 6, 75, 76, 105, 106, or 107 that are joined.

This structure further strengthens joining of the joint members 5, 6, 75, 76, 105, 106, and 107.

REFERENCE SIGNS LIST

1 JOINT STRUCTURE
5 JOINT MEMBER
6 JOINT MEMBER
11 MAIN BODY PART
12 JOINT PART
15 JOINING SURFACE
16 PROJECTING PART
16a BULGING PART
21 MAIN BODY PART
22 JOINT PART
25 JOINING SURFACE
26 RECESSED PART
26a BULGING PART
31 JOINT STRUCTURE (SECOND EMBODIMENT)
33 ENERGY DIRECTOR
35 WELDING LAYER
41 JOINT STRUCTURE (THIRD EMBODIMENT)
42 AUXILIARY PROJECTING PART
44 AUXILIARY RECESSED PART
51 JOINT STRUCTURE (FOURTH EMBODIMENT)
53 THROUGH HOLE
54 THROUGH HOLE
55 POSITIONING PIN
61 JOINT STRUCTURE (FIFTH EMBODIMENT)
62 FRAME MEMBER
71 JOINT STRUCTURE (SIXTH EMBODIMENT)
75 JOINT MEMBER
76 JOINT MEMBER
101 JOINT STRUCTURE (SEVENTH EMBODIMENT)
105 JOINT MEMBER
106 JOINT MEMBER
107 JOINT MEMBER

The invention claimed is:

1. A joint member formed of a composite including reinforcement fibers and resin, wherein:
the joint member is configured to be joined with another joint member to form a joint structure capable of enduring a tensile load in a load direction in which the joint member and the other joint member are separated from each other at a joined portion of the joint structure in a longitudinal direction of the joint member;
the joint member comprises:
a main body part; and
a joint part connected with the main body part at an end part of the main body part in the longitudinal direction of the joint member;
the joint part includes either projecting parts provided with bulging parts to form a dovetail shape or recessed parts provided with bulging parts to form a dovetail groove, the joint part being configured to be joined to a joint part which has a complementary shape of the other joint member to endure the tensile load in the longitudinal direction of the joint member;
the joint part has an orientation pattern having anisotropy such that fiber directions of the reinforcement fibers included in the joint part include a fiber direction different from the longitudinal direction of the joint member; and
the joint part has an orientation pattern in which the reinforcement fibers are provided along an external shape of the joint part and the reinforcement fibers are wound toward an inside of the joint part.

2. The joint member according to claim 1, wherein the main body part has a hollow structure.

3. The joint member according to claim 1, wherein:
a fitting direction in which the joint part of the joint member is to be moved with respect to the other joint member to join the joint part of the joint member to the joint part which has the complementary shape of the other joint member is a direction different from the longitudinal direction of the joint member; and
the joint part of the joint member has a shape allowing movement in the fitting direction with respect to the joint part of the other joint member.

4. The joint member according to claim 3, wherein:
the joint member comprises a plurality of the joint parts; and
the fitting directions corresponding to the respective joint parts are mutually different directions.

5. A joint structure comprising:
a plurality of the joint members according to claim 1, wherein the joint part of a first of the joint members is joined to the joint part of a second of the joint members.

6. The joint structure according to claim 5, wherein the joint part of the first of the joint members is welded to the joint part of the second of the joint members.

7. The joint structure according to claim 5, further comprising an adhesive layer between the joint part of the first of the joint members and the joint part of the second of the joint members.

8. The joint structure according to claim 5, further comprising a positioning member determining positions of the joint part of the first of the joint members and the joint part of the second of the joint members that are joined with each other.

9. A joint member formed of a composite including reinforcement fibers and resin, wherein:
the joint member is configured to be joined with another joint member to form a joint structure capable of enduring a tensile load in a load direction in which the joint member and the other joint member are separated from each other at a joined portion of the joint structure in a longitudinal direction of the joint member;
the joint member comprises:
a main body part; and
a joint part connected with the main body part at an end part of the main body part in the longitudinal direction of the joint member;
the joint part includes either projecting parts provided with bulging parts to form a dovetail shape or recessed parts provided with bulging parts to form a dovetail groove, the joint part being configured to be joined to a joint part which has a complementary shape of the other joint member to endure the tensile load in the longitudinal direction of the joint member;

the joint part has an orientation pattern having anisotropy such that fiber directions of the reinforcement fibers included in the joint part include a fiber direction different from the longitudinal direction of the joint member;

the reinforcement fibers have fiber directions, each of which is aligned in one direction; and the joint part has an orientation pattern in which a layer having a fiber direction extending along the longitudinal direction of the joint member and a layer having a fiber direction crossing the longitudinal direction of the joint member are laid up.

10. The joint member according to claim 9, wherein the main body part has a hollow structure.

11. The joint member according to claim 9, wherein:

a fitting direction in which the joint part of the joint member is to be moved with respect to the other joint member to join the joint part of the joint member to the joint part which has the complementary shape of the other joint member is a direction different from the longitudinal direction of the joint member; and the joint part of the joint member has a shape allowing movement in the fitting direction with respect to the joint part of the other joint member.

12. The joint member according to claim 11, wherein:

the joint member comprises a plurality of the joint parts; and the fitting directions corresponding to the respective joint parts are mutually different directions.

13. A joint member formed of a composite including reinforcement fibers and resin, wherein:

the joint member is configured to be joined with another joint member to form a joint structure capable of enduring a tensile load in a load direction in which the joint member and the other joint member are separated from each other at a joined portion of the joint structure in a longitudinal direction of the joint member;

the joint member comprises:

a main body part; and a joint part connected with the main body part at an end part of the main body part in the longitudinal direction of the joint member;

the joint part includes either projecting parts provided with bulging parts to form a dovetail shape or recessed parts provided with bulging parts to form a dovetail groove, the joint part being configured to be joined to a joint part which has a complementary shape of the other joint member to endure the tensile load in the longitudinal direction of the joint member;

the joint part has an orientation pattern having anisotropy such that fiber directions of the reinforcement fibers included in the joint part include a fiber direction different from the longitudinal direction of the joint member;

the reinforcement fibers are discontinuous reinforcement fibers; and the joint part has an orientation pattern in which the reinforcement fibers have fiber directions scattered in the bulging parts.

14. The joint member according to claim 13, wherein the main body part has a hollow structure.

15. The joint member according to claim 13, wherein:

a fitting direction in which the joint part of the joint member is to be moved with respect to the other joint member to join the joint part of the joint member to the joint part which has the complementary shape of the other joint member is a direction different from the longitudinal direction of the joint member; and the joint part of the joint member has a shape allowing movement in the fitting direction with respect to the joint part of the other joint member.

16. The joint member according to claim 15, wherein:

the joint member comprises a plurality of the joint parts; and the fitting directions corresponding to the respective joint parts are mutually different directions.

17. A joint member formed of a composite including reinforcement fibers and resin, wherein:

the joint member is configured to be joined with another joint member to form a joint structure capable of enduring a tensile load in a load direction in which the joint member and the other joint member are separated from each other at a joined portion of the joint structure in a longitudinal direction of the joint member;

the joint member comprises:

a main body part; and a joint part connected with the main body part at an end part of the main body part in the longitudinal direction of the joint member;

the joint part includes either projecting parts provided with bulging parts to form a dovetail shape or recessed parts provided with bulging parts to form a dovetail groove, the joint part being configured to be joined to a joint part which has a complementary shape of the other joint member to endure the tensile load in the longitudinal direction of the joint member;

the joint part has an orientation pattern having anisotropy such that fiber directions of the reinforcement fibers included in the joint part include a fiber direction different from the longitudinal direction of the joint member;

the main body part and the joint part have a lattice or a truss structure formed of a plurality of first frame members which extend, with their longitudinal direction, in a first direction, and a plurality of second frame members which extend, with their longitudinal direction thereof, in a second direction which is different from the first direction; and the joint part has an orientation pattern in which the reinforcement fibers are provided along the first direction and the second direction.

18. The joint member according to claim 17, wherein the main body part has a hollow structure.

19. The joint member according to claim 17, wherein:

a fitting direction in which the joint part of the joint member is to be moved with respect to the other joint member to join the joint part of the joint member to the joint part which has the complementary shape of the other joint member is a direction different from the longitudinal direction of the joint member; and the joint part of the joint member has a shape allowing movement in the fitting direction with respect to the joint part of the other joint member.

20. The joint member according to claim 19, wherein:

the joint member comprises a plurality of the joint parts; and the fitting directions corresponding to the respective joint parts are mutually different directions.

* * * * *